United States Patent
Driess

(10) Patent No.: US 9,322,190 B2
(45) Date of Patent: Apr. 26, 2016

(54) MODULAR MULTI-STORY PRODUCTION PLANT AND METHODS FOR CONSTRUCTING SAME

(71) Applicant: DSM IP Assets B.V., Heerlen (NL)

(72) Inventor: Markus Driess, Basel (CH)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/678,763

(22) Filed: Apr. 3, 2015

(65) Prior Publication Data
US 2015/0211249 A1    Jul. 30, 2015

Related U.S. Application Data

(63) Continuation of application No. 14/130,133, filed as application No. PCT/EP2013/062527 on Jun. 28, 2012, now abandoned.

(60) Provisional application No. 61/502,110, filed on Jun. 28, 2011.

(51) Int. Cl.
*E04H 5/08* (2006.01)
*E04H 5/00* (2006.01)
(Continued)

(52) U.S. Cl.
CPC .. *E04H 5/00* (2013.01); *B66B 9/00* (2013.01); *E04F 11/02* (2013.01); *E04H 1/005* (2013.01); *E04H 5/02* (2013.01); *E04H 5/08* (2013.01); *E04H 14/00* (2013.01); *A23N 17/00* (2013.01)

(58) Field of Classification Search
CPC ............. E04H 1/005; E04H 5/02; E04H 5/08; B66B 9/00
USPC .......... 52/30, 33, 79.1, 79.6, 79.7, 79.8, 79.9, 52/79.12, 79.13, 73, 143, 192, 197, 234, 52/236.3, 745.03, 648.1, 650.3
See application file for complete search history.

(56) References Cited

U.S. PATENT DOCUMENTS

| | | | |
|---|---|---|---|
| 1,362,069 | A | 12/1920 | Witzel |
| 3,225,434 | A | 12/1965 | van der Lely et al. |

(Continued)

FOREIGN PATENT DOCUMENTS

| | | |
|---|---|---|
| EP | 0 847 788 | 6/1998 |
| EP | 1 908 359 | 4/2008 |

(Continued)

OTHER PUBLICATIONS

International Search Report for PCT/EP2012/062527, mailed Feb. 4, 2013.

*Primary Examiner* — Beth Stephan
(74) *Attorney, Agent, or Firm* — Nixon & Vanderhye P.C.

(57) ABSTRACT

A multistory modular production plant includes a vertical stack of production modules for supporting production equipment, and a vertical stack of operator access modules adjacently connected to the vertically stacked production modules to allow operator access to the production modules. The adjacently connected vertical stacks of production modules and operator access modules thereby establish multiple stories of the modular production plant. Stairs and/or an elevator may be provided in the vertical stack of operator access modules to allow an operator to ascent/descend between stories of the plant. In especially preferred embodiments, each production module and operator access module is in the form of a rectangular parallelepiped which is sized so as to be accommodated within a standard 20-foot shipping container. This configuration of modular units thus allows the plant to be more quickly shipped and constructed on site.

8 Claims, 16 Drawing Sheets

(51) Int. Cl.
    *E04H 5/02*     (2006.01)
    *B66B 9/00*     (2006.01)
    *E04H 1/00*     (2006.01)
    *E04F 11/02*     (2006.01)
    *E04H 14/00*     (2006.01)
    *A23N 17/00*     (2006.01)

(56) References Cited

U.S. PATENT DOCUMENTS

| | | |
|---|---|---|
| 3,292,327 A | 12/1966 | van der Lely |
| 3,378,964 A | 4/1968 | Erickson |
| 3,755,974 A | 9/1973 | Berman |
| 3,923,096 A | 12/1975 | van der Lely |
| 4,231,148 A | 11/1980 | Harding |
| 5,012,621 A | 5/1991 | Power et al. |
| 5,474,411 A | 12/1995 | Schoenfeld et al. |
| 5,577,362 A | 11/1996 | Yamashita et al. |
| 6,425,463 B1 | 7/2002 | Broyan |
| 6,925,761 B1 | 8/2005 | De La Marche |

FOREIGN PATENT DOCUMENTS

| | | |
|---|---|---|
| FR | 2 276 788 | 1/1976 |
| FR | 2 748 053 | 10/1997 |
| WO | 2006/093757 | 9/2006 |

MODULAR MULTI-STORY PRODUCTION PLANT AND METHODS FOR CONSTRUCTING SAME

CROSS-REFERENCE TO RELATED APPLICATIONS

This application is a continuation of U.S. patent application Ser. No. 14/130,133, filed Dec. 30, 2013 (now abandoned) which is the national phase application of International Application No. PCT/EP2013/062527, filed Jun. 28, 2012, which designated the U.S. and claims benefit from U.S. Provisional No. 61/502,110, filed Jun. 28, 2011, the entire contents of each of which are hereby incorporated by reference.

FIELD

The disclosed embodiments herein relate to production plants and methods for their construction. In especially preferred embodiments, the disclosed embodiments herein relate to a production plant that is adapted to mix solid and/or liquid components (e.g., vitamins and/or nutraceuticals) that can be packaged as a pre-mix formulation and later used as an additive for an end product, such as animal feed.

BACKGROUND

In the field of animal nutrition, it is typically necessary to add micronutrients to feed at very small dosage levels, e.g., on the order of grams per ton of feed. The direct addition of such small doses of micronutrients to animal feed is difficult to achieve for several reasons. For example, the small doses required of the micronutrients are firstly difficult to weigh out. Even if the correct dosage weight of the micronutrients can be achieved, it is practically impossible to achieve an even distribution of the micronutrients throughout the finished animal feed product.

In order to address the problems noted above, the animal feed industry has traditionally formulated so-called feed "premix" containing a tailored blend of nutrients together with a feed diluent. The feed premix may then be more readily added to other feed components at a rate of several kilograms per ton of feed. In such a manner, therefore, the relatively small, but necessarily important, nutrients in the premix are evenly distributed through the entirety of the finished animal feed product.

It is oftentimes desirable to assemble an animal feed premix plant in relatively short time due to market demands and/or production disruptions. Typically, a new plant must be designed for each potential feed manufacturer at its specific location. As can be appreciated, such a custom plant can take a considerable amount of time to design and construct thereby adding to potential costs and production delays.

It would be especially desirable if a plant could be devised that is capable of being relatively quickly designed and constructed. It is toward fulfilling such a need that the present invention is directed.

SUMMARY OF EXEMPLARY EMBODIMENTS

Broadly, the embodiments disclosed herein relate to a modular multistory production plant. In especially preferred embodiments, the production plant is provided by a number of individual plant modules each being capable of shipment within a standard shipping container. The modular units can thus be more readily shipped to a plant site and constructed so as to connect one module to another on-site to thereby provide the multistory production plant.

According to some embodiments, a modular production plant is provided which comprises a vertical stack of production modules for supporting production equipment, and a vertical stack of operator access modules adjacently connected to the vertically stacked production modules to allow operator access to the production modules. The adjacently connected vertical stacks of production modules and operator access modules thereby establish multiple stories of the modular production plant.

The operator access modules preferably comprise a stairwell to allow operator access to each of the multiple stories of the modular production plant and/or an elevator well in which an elevator is operably positioned. Such operator access means allows an operator to ascend and descend from one story of the production plant to another.

Especially preferred embodiments will include production modules and operator access modules which have a rectangular parallelepiped shape. Such rectangular parallelpiped shape of both the production modules and operator access modules is preferably provided by a series of rigidly interconnected vertical and horizontal frame members. It is especially preferred that the rectangular parallelpiped shape of both the production modules and operator access modules is sized so each such module may be accommodated within a standard 20-foot shipping container.

Various embodiments of the modular production plant may include a cantilevered platform connected to and extending outwardly from an uppermost one of the production modules in the vertical stack thereof. Guardrails may optionally be provided about a perimeter of each of the multiple stories of the production plant for the purpose of operator safety.

At least one additional module of certain embodiments may be adjacently connected to a lowermost production module or operator access module in the vertical stacks thereof. In some embodiments such an additional module is adjacently connected to a lowermost production module and operator access module in the vertical stacks thereof.

The present invention is also directed toward a method of constructing a multistory modular production plant. According to certain preferred embodiments, a series of individual production modules and a series of individual operator access modules are provided. The production modules and the operator access modules may then be rigidly interconnected to one another in such a manner to form a vertical stack of the production modules which is adjacently connected to a vertical stack of the operator access modules and thereby establish multiple stories of the modular production plant.

These as well as other aspects of the embodiments disclosed herein will be better understood after consideration is given to the accompanying drawings and the detailed description thereof which follows.

BRIEF DESCRIPTION OF ACCOMPANYING DRAWINGS

Reference will be made to the accompanying drawing FIGURES, wherein like reference numerals refer to like structural elements which depict exemplary non-limiting illustrative embodiments, wherein.

Figure 4:
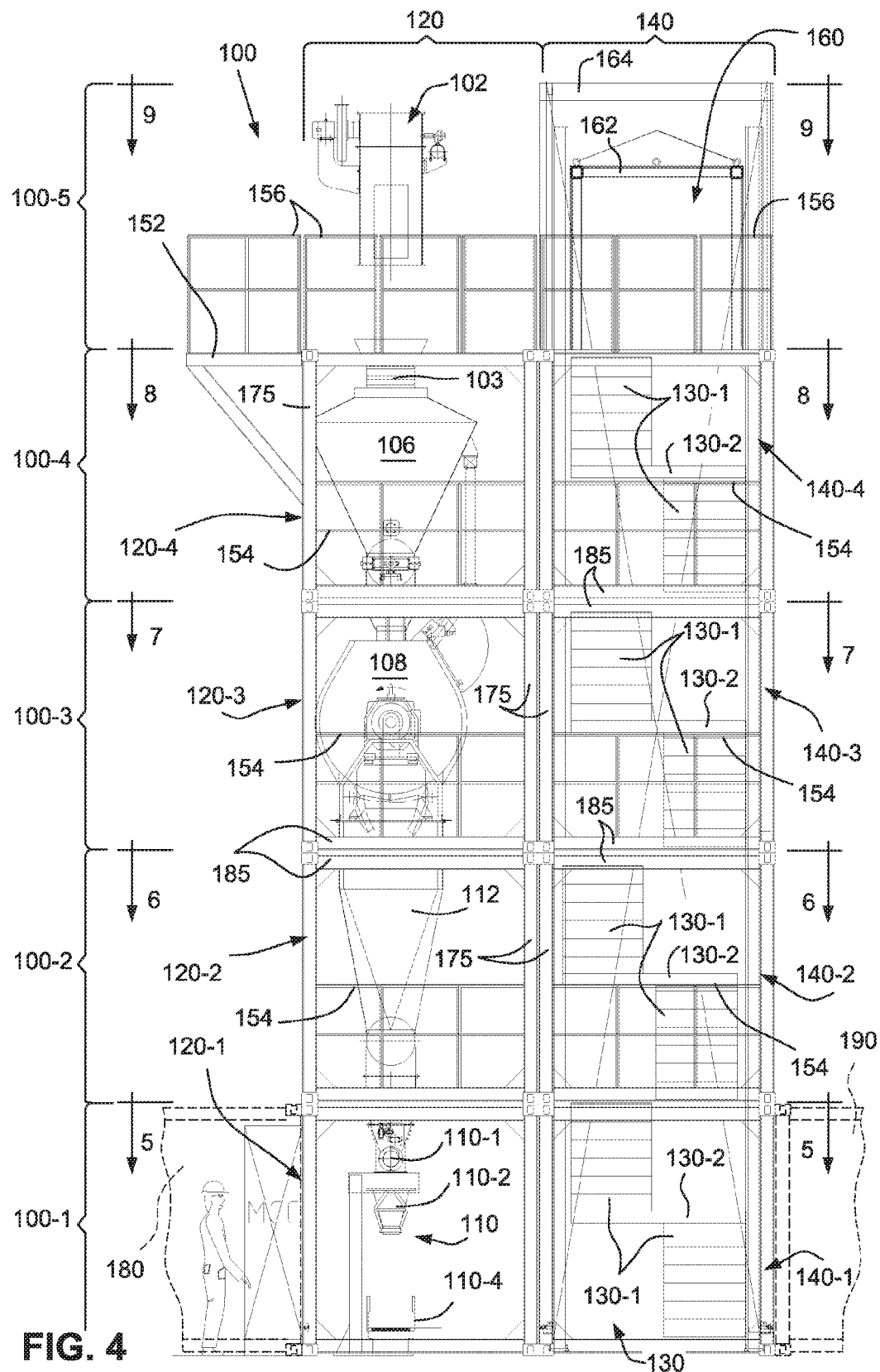
FIG. 4 is side elevational view of the modular plant depicted in FIG. 3.
Figure 5:
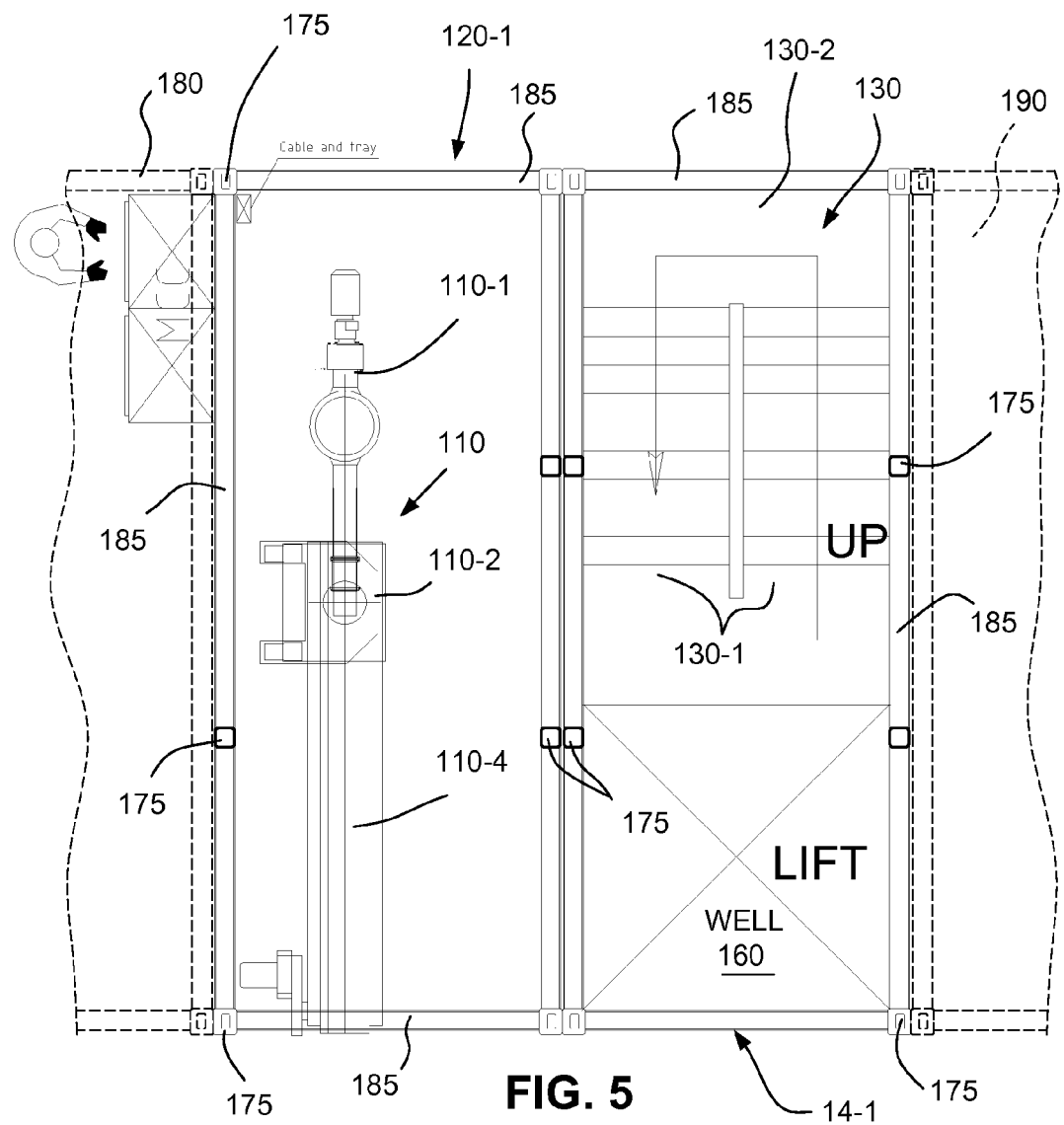
FIG. 5 is a top plan view of the modular units forming the first story of the plant depicted in FIGS. 3 and 4 as taken along line 5-5 in FIG. 4.
Figure 6:
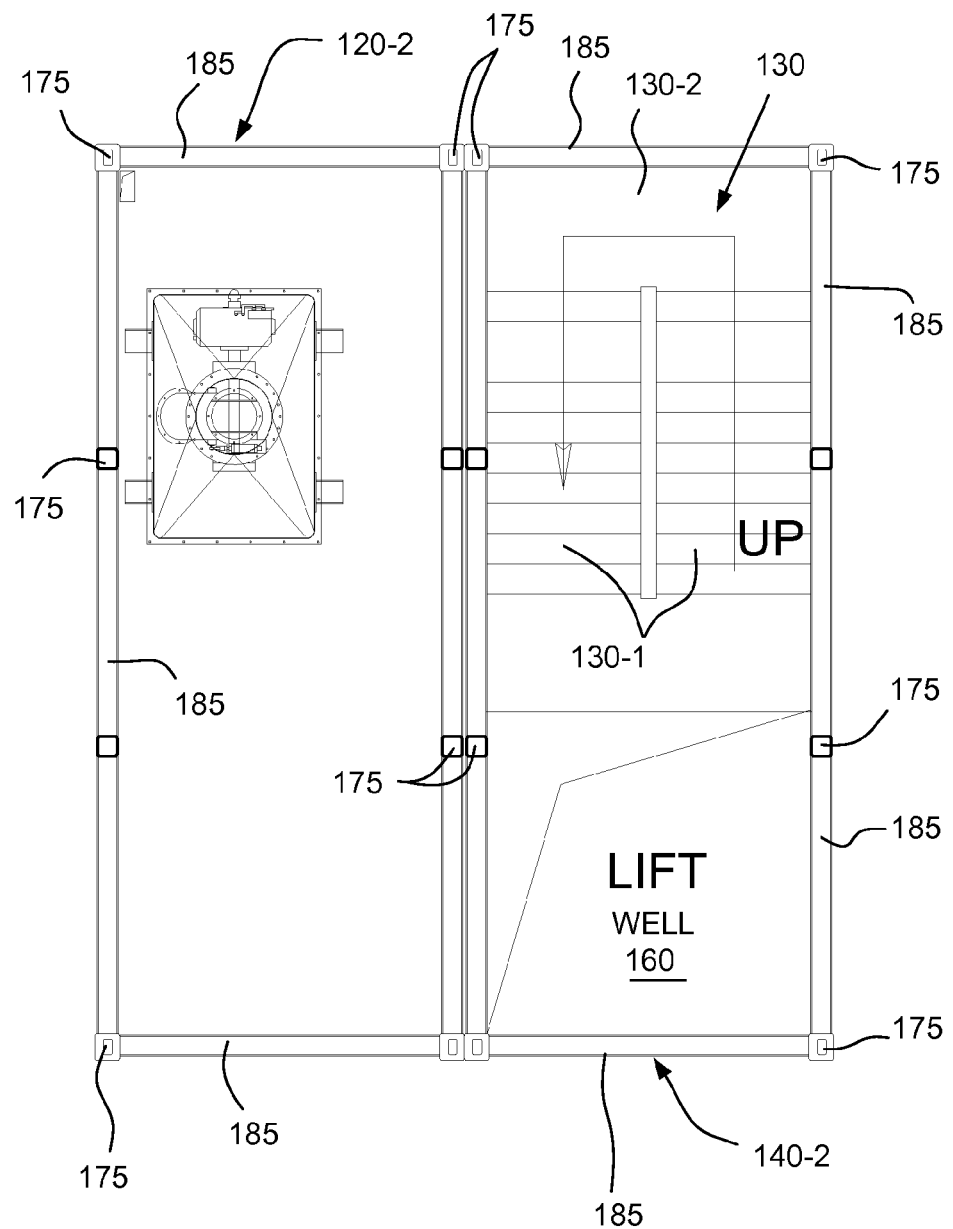
FIG. 6 is a top plan view of the modular units forming the second story of the plant depicted in FIGS. 3 and 4 as taken along line 6-6 in FIG. 4.
Figure 7:
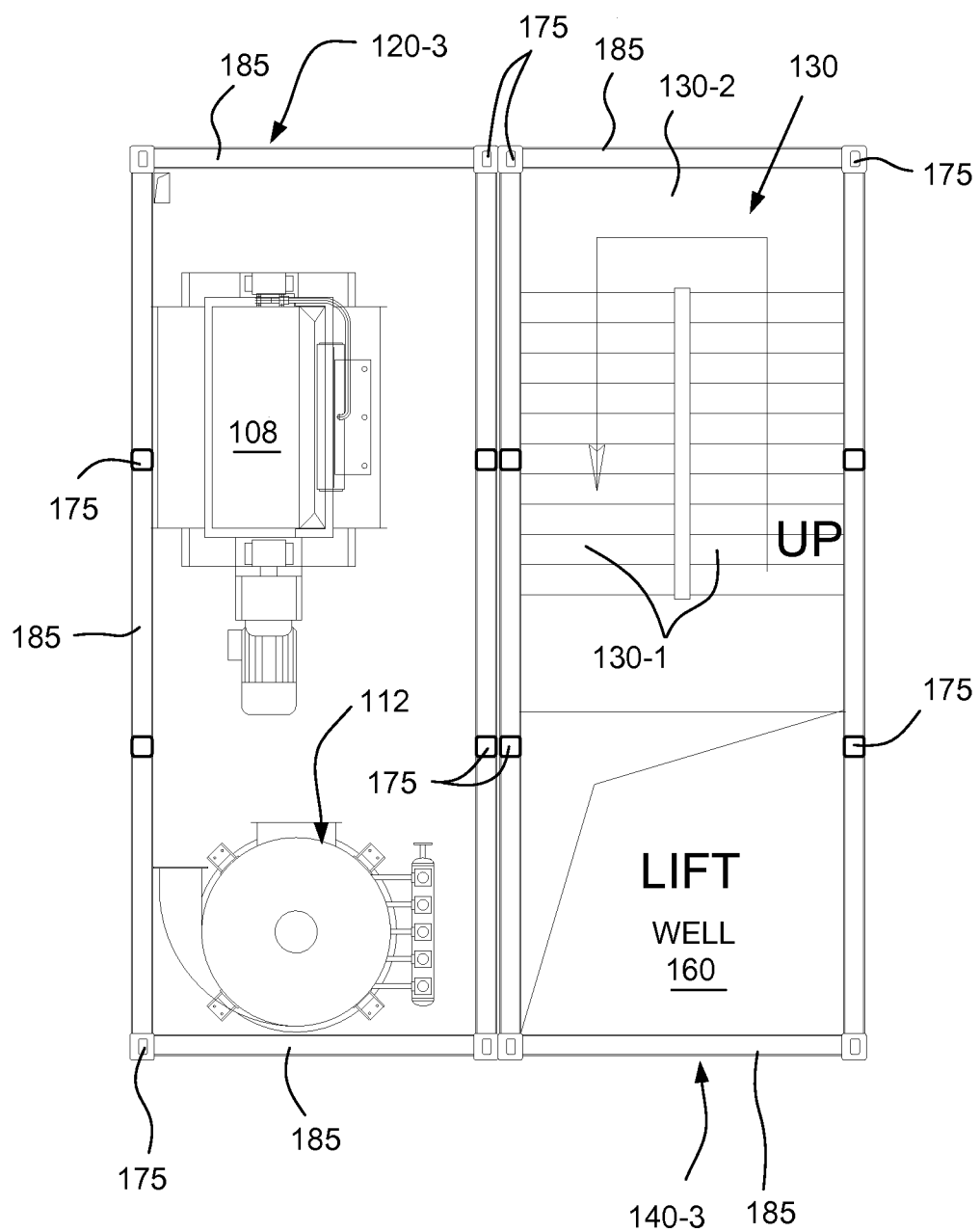
FIG. 7 is a top plan view of the modular units forming the third story of the plant depicted in FIGS. 3 and 4 as taken along line 7-7 in FIG. 4.
Figure 8:
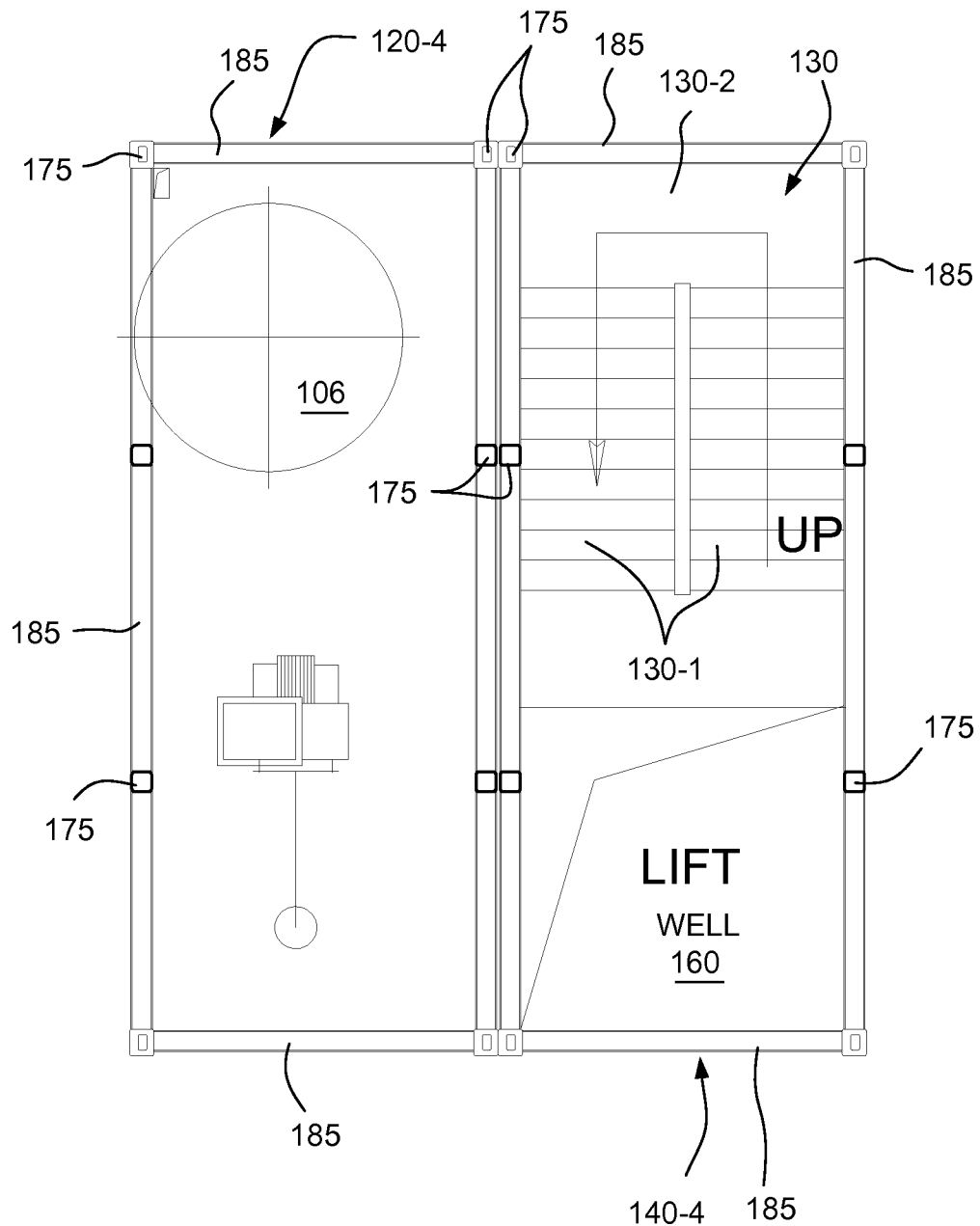
FIG. 8 is a top plan view of the modular units forming the fourth story of the plant depicted in FIGS. 3 and 4 as taken along line 8-8 in FIG. 4.
Figure 9:
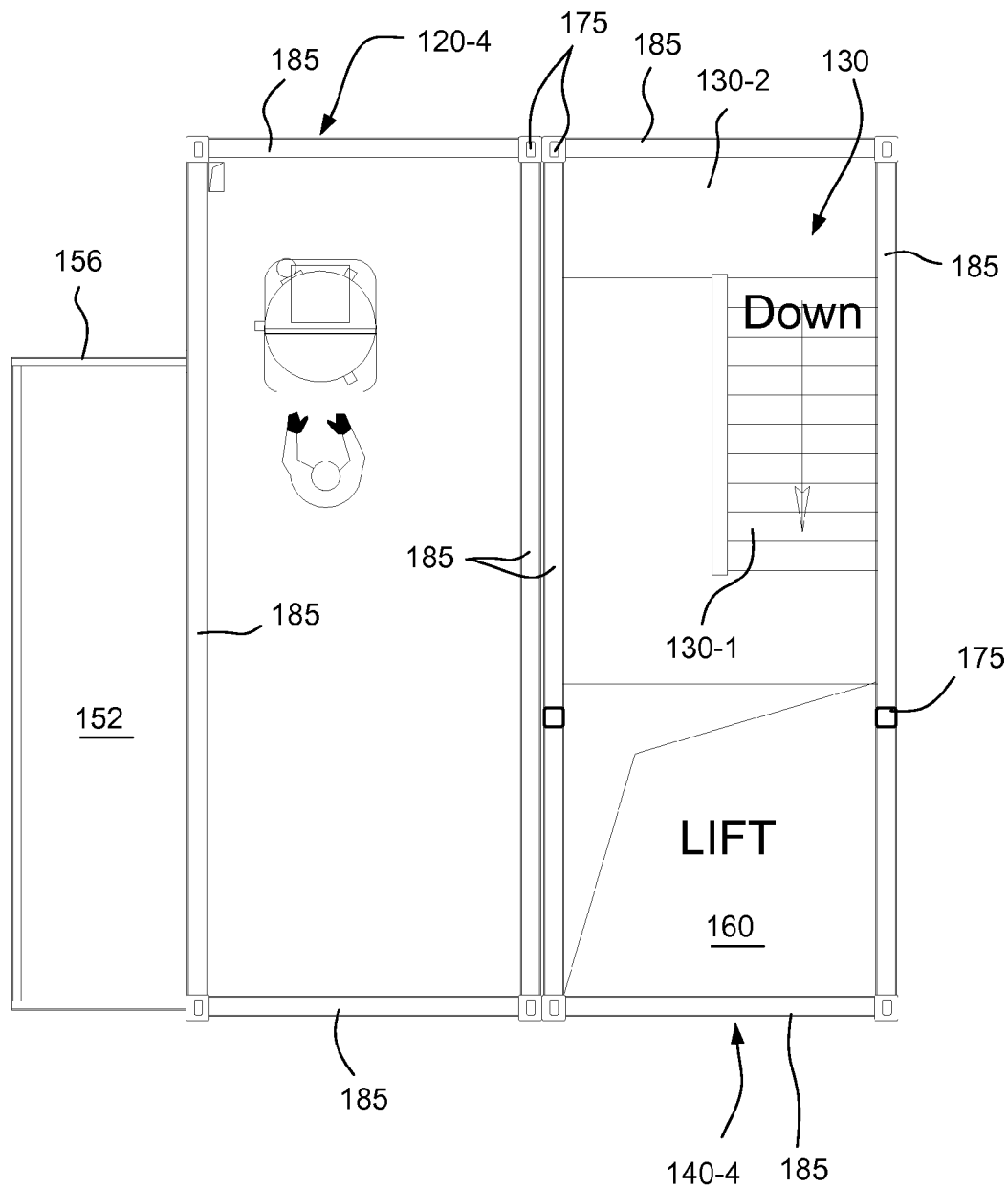
FIG. 9 is a top plan view of the modular units forming the fifth story of the plant depicted in FIGS. 3 and 4 as taken along line 9-9 in FIG. 4.
Figure 11:
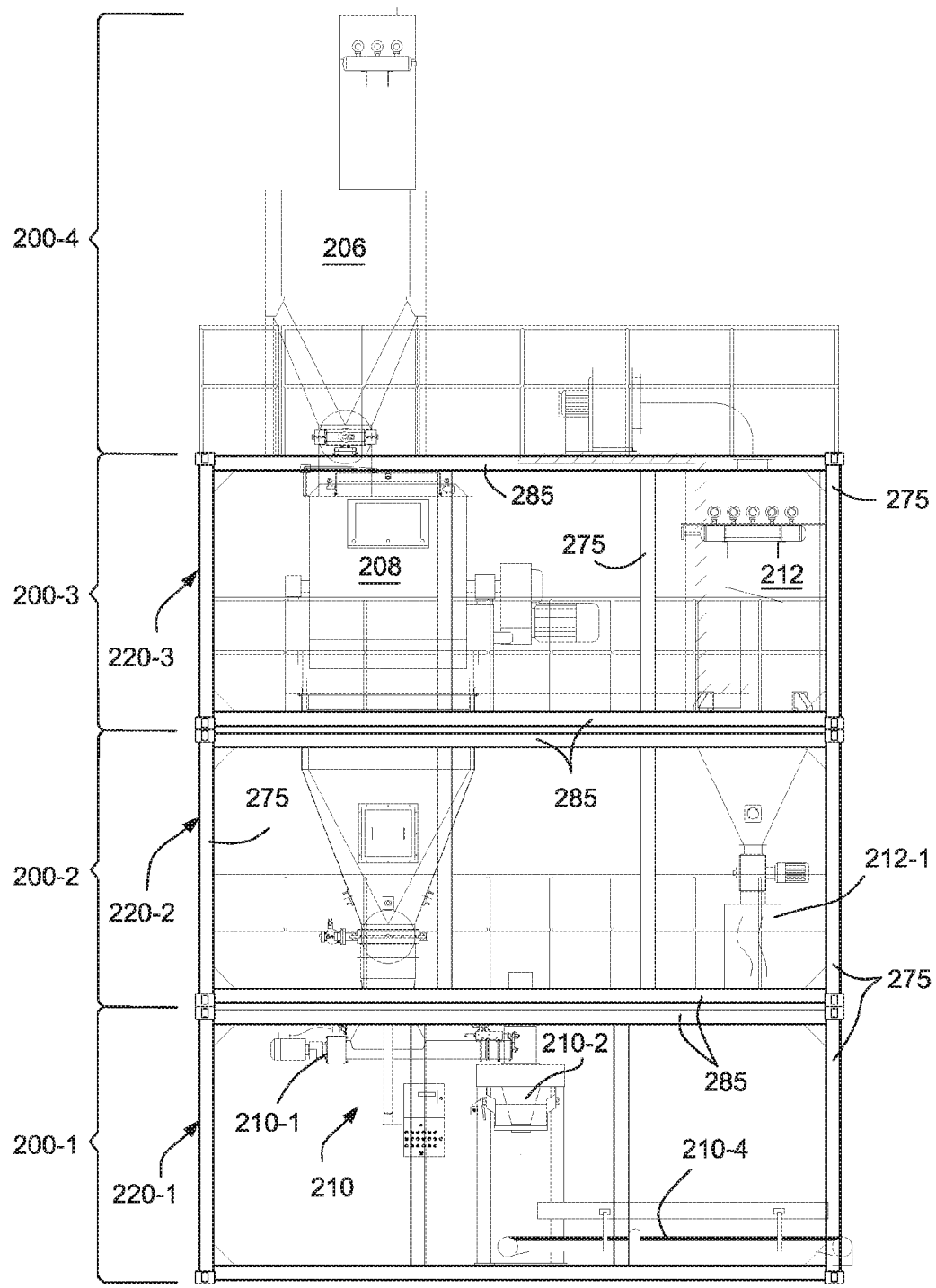
FIG. 11 is a front elevational view of a modular plant according to the present invention which embodies the flow diagram of FIG. 10.
Figure 12:
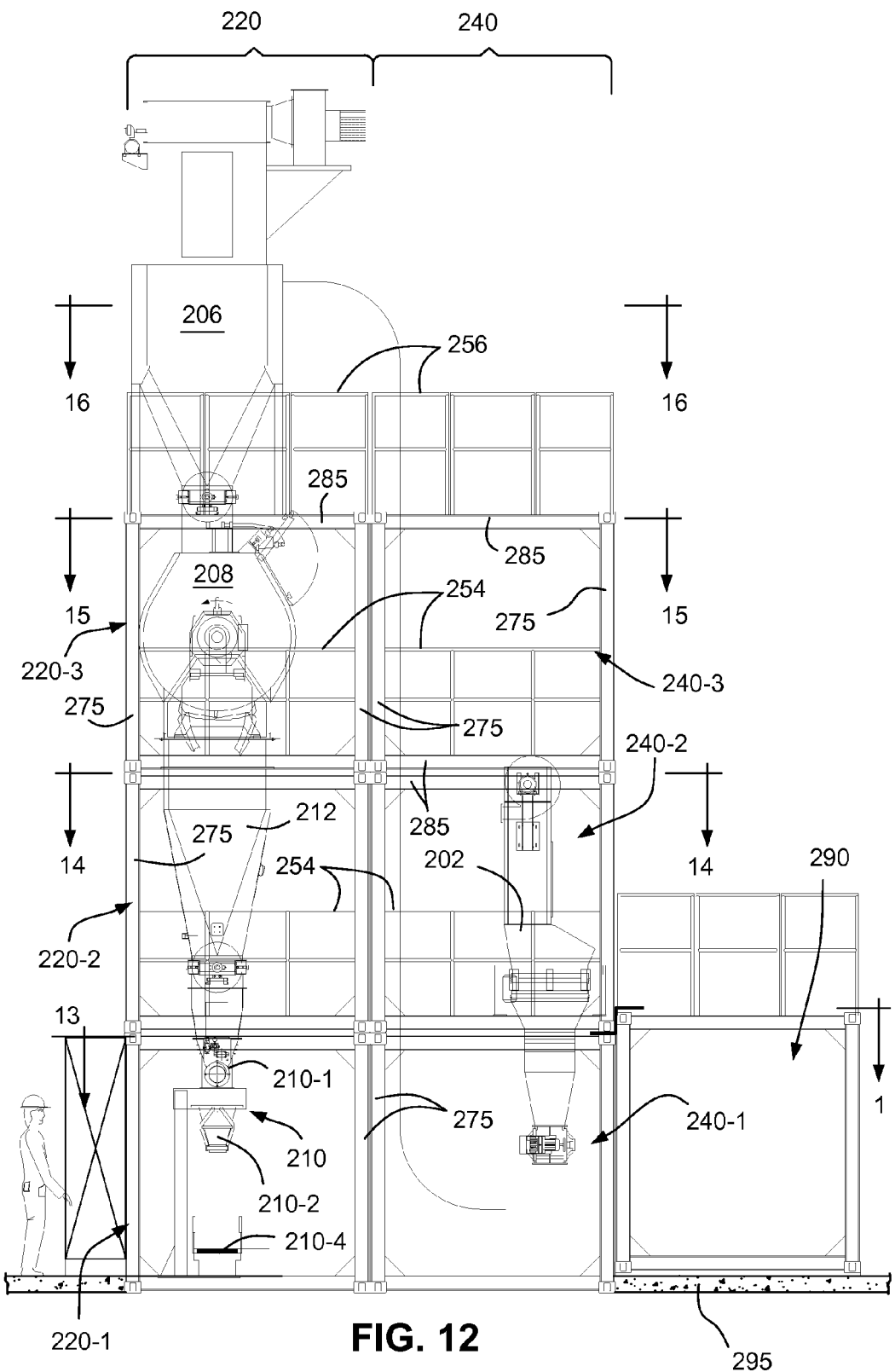
FIG. 12 is side elevational view of the modular plant depicted in FIG. 11.
Figure 13:
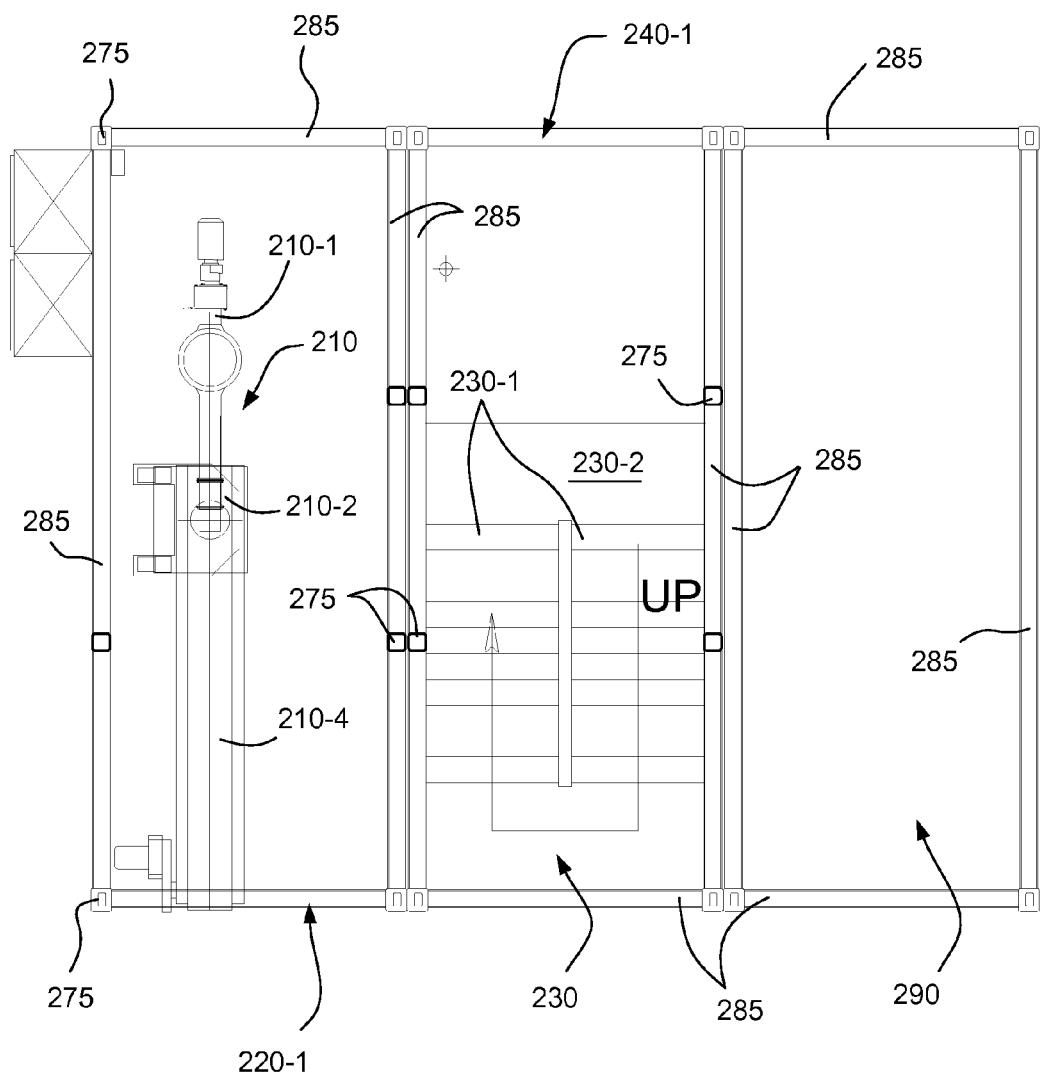
FIG. 13 is a top plan view of the modular units forming the first story of the plant depicted in FIGS. 11 and 12 as taken along line 13-13 in FIG. 12.
Figure 15:
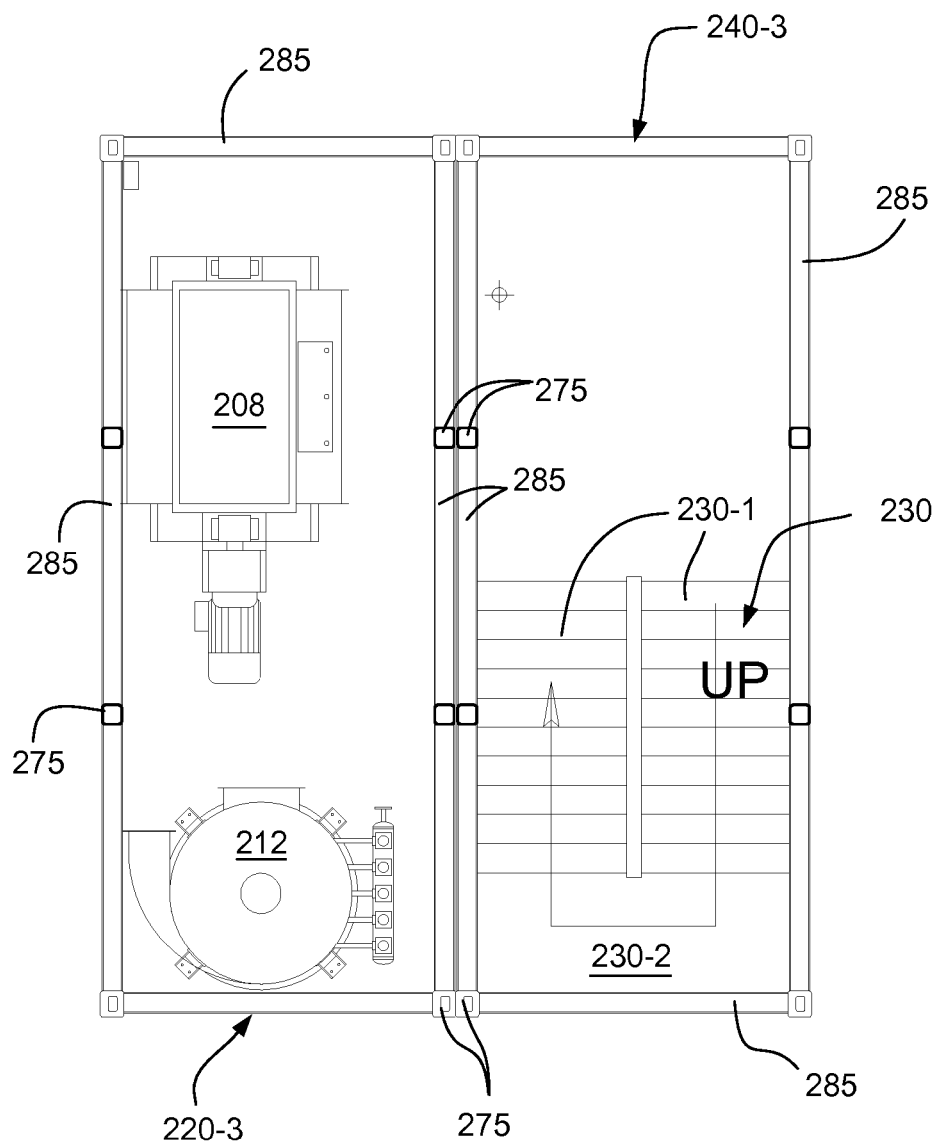
Figure 16:
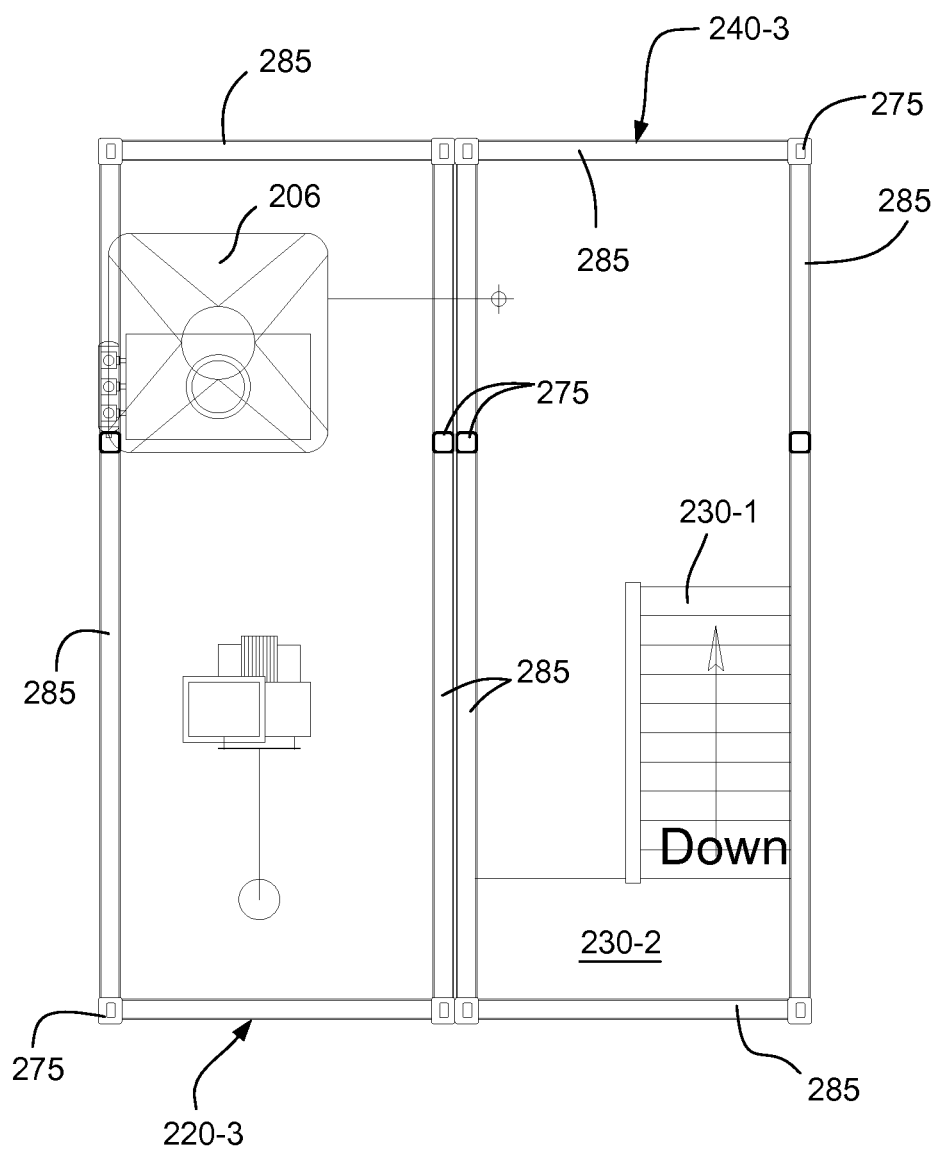

FIG. 15 is a top plan view of the modular units forming the third story of the plant depicted in FIGS. 11 and 12 as taken along line 15-15 in FIG. 4; and FIG. 16 is a top plan view of the modular units forming the plant depicted in FIGS. 11 and 12 as taken along line 16-16 in FIG. 4.

DETAILED DESCRIPTION

As noted previously, especially preferred embodiments of the present invention are directed toward modular premix plants that are used to make a pre-blend or premix of micronutrients which have to be added to animal feed compositions. In this regard, animal feed compositions or diets have a relatively high content of protein as seen, for example, from the poultry and pig diets disclosed in WO 01/58275 (the entire content of which is incorporated expressly hereinto by reference).

Figure 1:
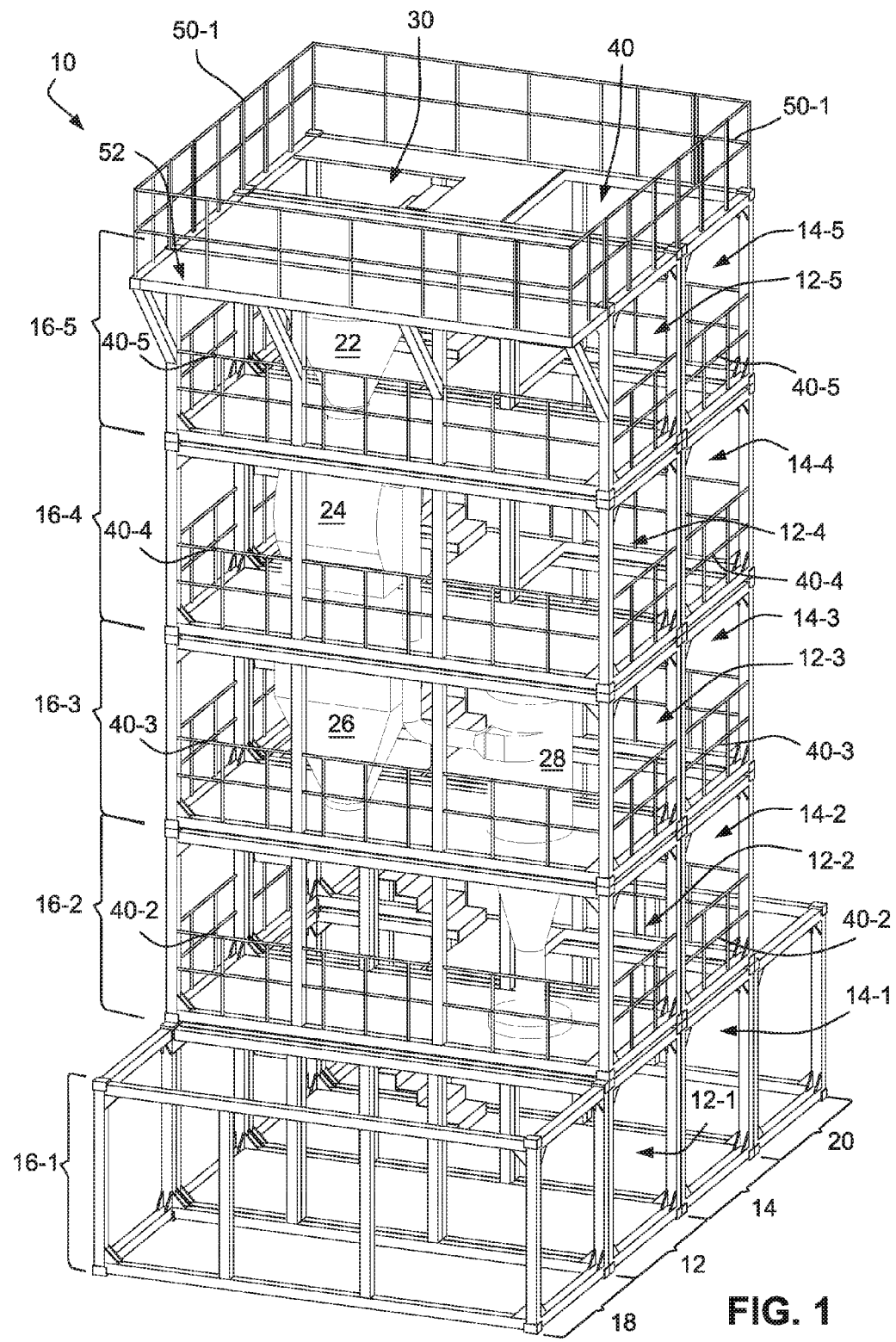
FIG. 1 is a perspective view of an assembled modular plant according to an embodiment of the present invention.

Usually fat and water soluble vitamins, as well as trace minerals, health ingredients, and optionally enzymes, organic acids and other components form part of a so-called premix intended for addition to the feed, whereas macro minerals are usually separately added to the feed. Accompanying FIG. 1 depicts one possible embodiment of a modular animal feed premix plant 10 according to the present invention that may be provided so as to form an animal feed premix product.

As shown, the plant 10 is comprised of a vertical stack 12 of production equipment modules 12-1 through 12-5 and an adjacent vertical stack 14 of operator access modules 14-1 through 14-5. Adjacent ones of the modules 12-1 through 12-5 in the vertical stack 12 are connected to each other and to a horizontally adjacent one of the modules 14-1 through 14-5 in the module stack 14. As such, the interconnected modules 12-1 through 12-5 and 14-1 through 14-5 form respective floors or stories 16-1 through 16-5 of the plant 10.

Modules 18 and 20 may be connected adjacent to the modules 12-1 and 14-1 of the module stacks 12 and 14, respectively. The modules 18 and 20 may thus serve the purpose of providing a control station, dispensary room, storage room or the like. Moreover, these modules 18 and 20 (as well as any other module 12-1 through 12-5 and/or 14-1 through 14-5) may be covered with suitable roof and/or side planking (not shown) for protection from the ambient conditions of the plant site.

The modules 12-1 through 12-5 of the production equipment stack 12 are designed to accommodate production equipment, such as material input unit 22, mixing equipment 24, hopper 26, and cyclone separator 28. Packaging equipment (not shown in FIG. 1 but see, e.g., FIGS. 3 and 4) on the first story 16-1 of the plant 10 is provided to receive the blended premix and allow for its packaging in desired quantities.

The modules 14-1 through 14-5 of the operator access stack 14 are designed to allow operators to move from one of the stories 16-1 through 16-5 to another. For such purpose, the modules 14-1 through 14-5 of the operator access stack 14 are preferably provided with an interconnected stairwell 30 and a motorized elevator (lift) well 40.

Each of the modules 12-2 through 12-5 and 14-2 through 14-5 forming the second through the fifth stories 16-2 through 16-5 are provided with suitable perimeter guard rails 40-2 through 40-5, respectively, to ensure operator safety. The top of the modules 12-5 and 14-5 are preferably provided with sheeting 50 which provides for operator support at the top floor of the plant 10. A lateral cantilevered platform 52 may also be provided. Guard rails 50-1 surround the perimeter of the top floor to provide for operator safety.

Figure 2:
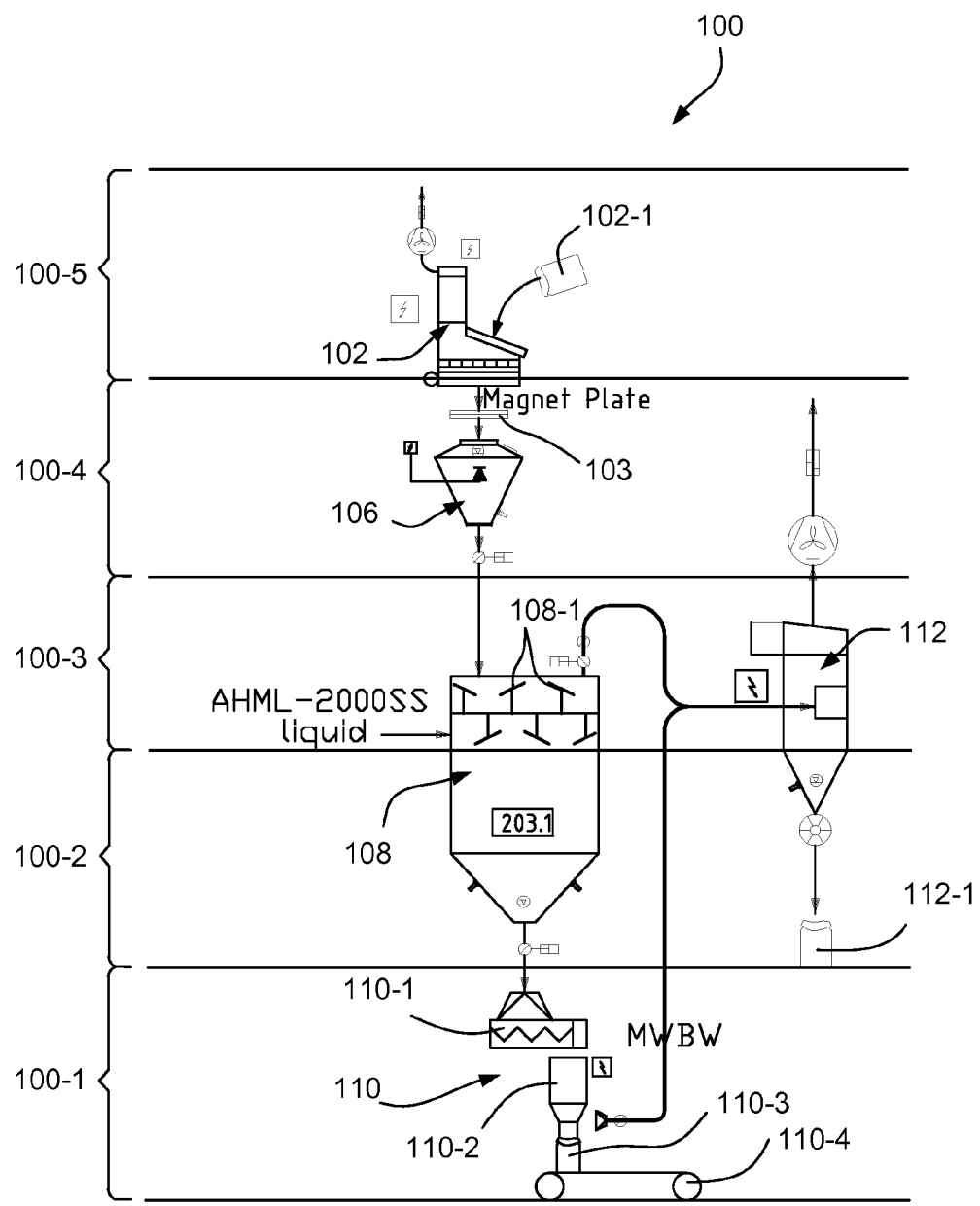
FIG. 2 is an elevational schematic flow diagram of one embodiment of an animal premix feed production plant according to the present invention.

FIG. 2 schematically depicts another embodiment of an animal feed premix production plant 100 according to the present invention. In this regard, the plant 100 is depicted as having four module stories 100-1 through 100-4, respectively. The module story 100-4 provides the floor for the top story 100-5.

The plant 100 depicted in FIG. 2 includes a hand-add station 102 where various ingredients and components of micronutrients and/or feed diluents (schematically depicted by numeral 102-1) are added. The added ingredients and components pass vertically downwardly through a magnet plate 103 which traps any metallic debris that may be present and then on to a hopper 106. The contents of the hopper 106 feed the mixer 108 supplied with internal mixing paddles 108-1. The premix formulation formed in the mixer 108 is then transferred to a packaging station 110 having a feed screw 110-1 which directs the premix formulation to a metering unit 110-2 for filling packages 110-3 on conveyor 110-4. Some material is directed to a cyclone separator 112 that can capture residual amounts by container 112-1.

Figure 3:
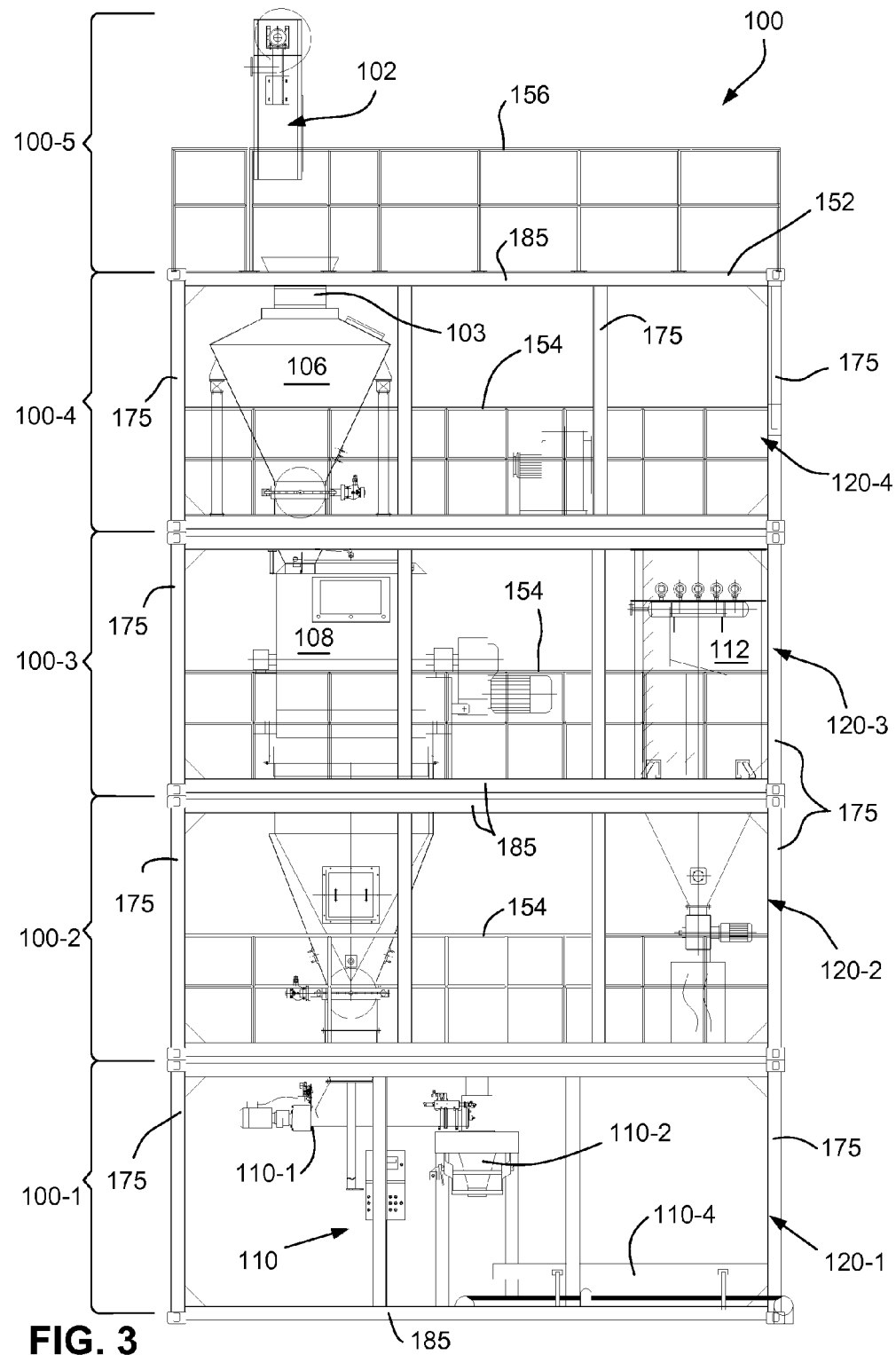
FIG. 3 is a front elevational view of a modular plant according to the present invention which embodies the flow diagram of FIG. 2.

Accompanying FIGS. 3 and 4 depict the structural arrangement of module units forming the premix plant 100 shown schematically in FIG. 2. In this regard, the plant 100 includes a vertical stack 120 of production modules 120-1 through 120-4 which are designed and configured to support the production equipment. A vertical stack 140 of operator access modules 140-1 through 140-4 is connected adjacent to the vertical stack 120 of production modules 120-1 through 120-4 of the production stack 120. In this regard, adjacent ones of the modules 120-1 through 120-4 in the vertical stack 120 are connected to each other and to a horizontally adjacent one of the modules 140-1 through 140-4 in the module stack 140. As such, the interconnected modules 120-1 through 120-4 and 140-1 through 140-4 form respective floors or stories 100-1 through 100-4 of the plant 100.

The top floor 100-5 is provided with a lateral cantilevered platform 152 connected rigidly to and extending outwardly from the module 120-4. Guardrails (a representative few of which are noted by reference numeral 154) are provided with each of the modules 120-1 through 120-4 and 140-1 through 140-4 for operator safety. In addition, the top floor 100-5 is provided with guardrails 156 for operator safety in connection with the hand-add station 102.

The modules 140-1 through 140-4 of the operator access stack 140 are designed to allow operators to move from one of the stories 100-1 through 100-5 to another. For such purpose, the modules 140-1 through 140-4 of the operator access stack 140 are provided with an interconnected stairwell 130 having a flight of stairs 130-1 and an associated stair landing 130-2.

An elevator (lift) well 160 is also provided vertically in the modules 140-1 through 140-4 of the operator access stack 140 so as to allow an operator elevator 162 to ascend/descend from one story 100-1 through 100-5 to another. An elevator support structure 164 is rigidly connected to the module 100-4 so as to support a motor (not shown) for operation of the elevator 162.

Modules 180 and/or 190 may be connected adjacent to the modules 120-1 and 140-1 of the module stacks 120 and 140, respectively. The modules 180 and 190 may thus serve the purpose of providing a control station, dispensary room, storage room or the like. Moreover, these modules 180 and 190 (as well as any other module 120-1 through 120-4 and/or 140-1 through 140-4) may be covered with suitable roof and/or side planking (not shown) for protection from the ambient conditions of the plant site.

As is perhaps best shown in FIGS. 5-9, each of the modules 120-1 through 120-4 and 140-1 through 140-4 are substantially identical to one another in size and configuration. More specifically, it will be seen that that each of the modules 120-1 through 120-4 and 140-1 through 140-4 are formed of a number of vertical frame members (a representative few of which are depicted by reference numeral 175) interconnected to a number of horizontal frame members (a representative few of which are depicted by reference numeral 185). The vertical frame members 175 and the horizontal frame members 185 are thus rigidly interconnected to one another so as to establish a generally rectangular parallelepiped shape which is sized so as to be accommodated within a standard 20-foot shipping container conventionally employed by the shipping industry.

Each of the individual production modules 120-1 through 120-4 may thus be further prefabricated to include specific support structures associated with the specific production equipment (e.g., hopper 106, mixer 108, packaging station 110, cyclone 112 and the like) that such module will support and contain. Similarly, each of the individual operator access modules 140-1 through 140-4 may be prefabricated to include the stairs 130-1 and associated landing 130-2 as well as the elevator well 150.

In use, the modules 120-1 through 120-4 and 140-1 through 140-4 and their associated equipment can be preassembled at the plant manufacturer's facility for the purpose of commissioning the plant. Thereafter the production equipment and associated plant components may be removed from the modules 120-1 through 120-4 and 140-1 through 140-4 and shipped individually along with each module to a production plant site. On arrival, the modules 120-1 through 120-4 and 140-1 through 140-4 may then be reassembled to one another along with their associated production equipment. As can be appreciated, by providing the entire production plant 100 in the form of separate modules 120-1 through 120-4 and 140-1 through 140-4 that can be shipped individually within a standard 20-foot shipping container will greatly decrease the necessary construction time thereby saving considerable cost.

Figure 10:
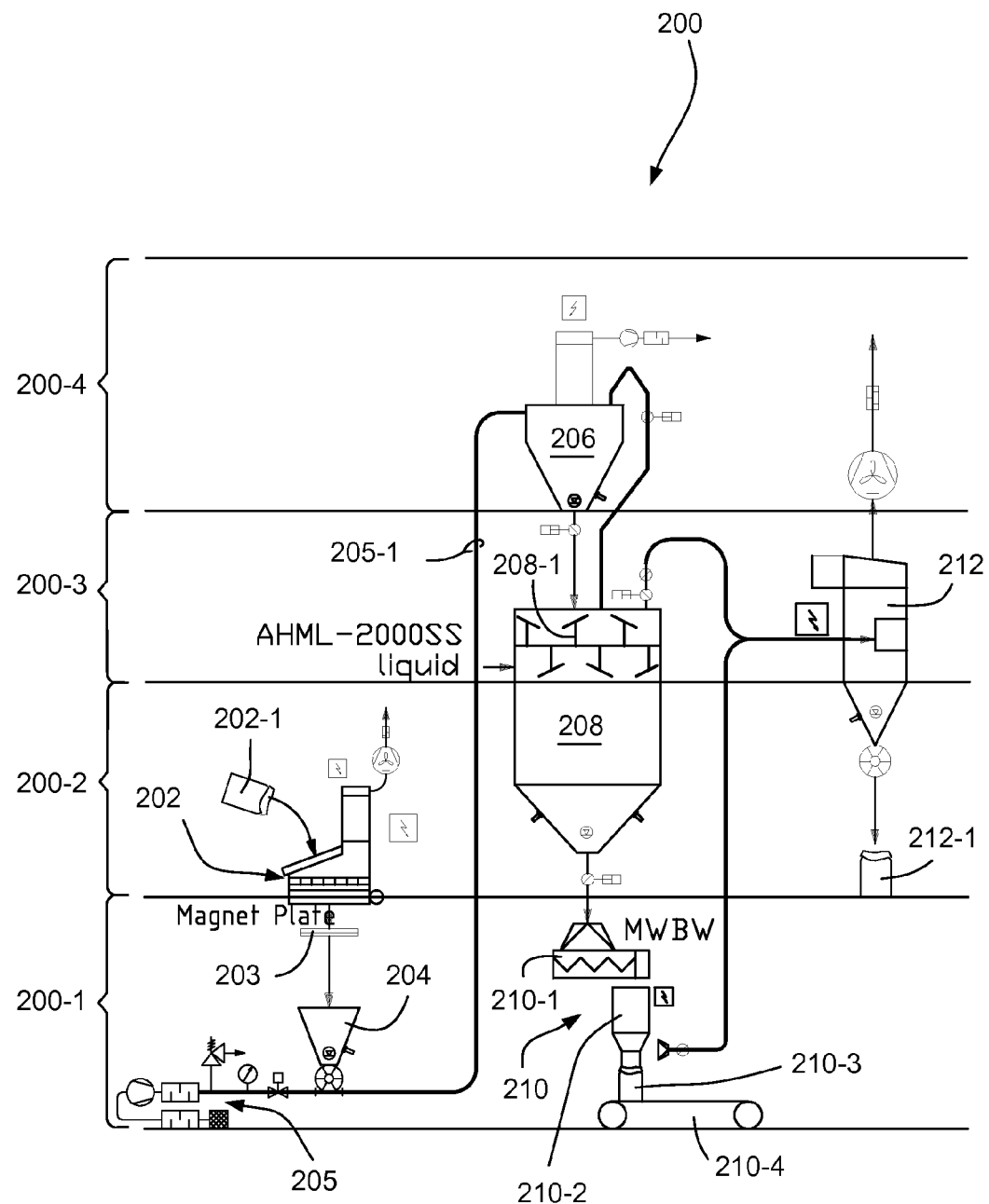
FIG. 10 is an elevational schematic flow diagram of another embodiment of an animal premix feed production plant according to the present invention.

FIG. 10 schematically depicts another embodiment of an animal feed premix production plant 200 according to the present invention. In this regard, the plant 200 is similar to plant 100 but includes three module stories 200-1 through 100-3, respectively. The module story 200-3 provides the floor for the top story 200-4.

The plant 200 depicted in FIG. 10 includes a hand-add station 202 located on story 200-2 where various ingredients and components of micronutrients and/or feed diluents (schematically depicted by numeral 202-1) are added. The added ingredients and components pass vertically downwardly through a magnet plate 203 which traps any metallic debris that may be present and then on to a transfer hopper 204. A compressed air system 205 is provided to pneumatically transfer the components via line 205-1 from transfer hopper 204 to the inlet of the feed hopper 206 feed which then gravity feeds the mixer 208 supplied with internal mixing paddles 208-1. The premix formulation formed in the mixer 208 is then transferred to a packaging station 210 having a feed screw 210-1 which directs the premix formulation to a metering unit 210-2 for filling packages 210-3 on conveyor 210-4. Some material is directed to a cyclone separator 212 that can capture residual amounts by container 212-1.

Accompanying FIGS. 11 and 12 depict the structural arrangement of module units forming the premix plant 200 shown schematically in FIG. 10. In this regard, the plant 200 includes a vertical stack 220 of production modules 220-1 through 220-3 which are designed and configured to support the production equipment. A vertical stack 240 of operator access modules 240-1 through 240-3 is connected adjacent to the vertical stack 220 of production modules 220-1 through 220-3 of the production stack 220. In this regard, adjacent ones of the modules 220-1 through 220-3 in the vertical stack 220 are connected to each other and to a horizontally adjacent one of the modules 240-1 through 240-3 in the module stack 240. As such, the interconnected modules 220-1 through 220-3 and 240-1 through 240-3 form the respective floors or stories 200-1 through 200-3 of the plant 100.

Guardrails (a representative few of which are noted by reference numeral 254) are provided with each of the modules 220-1 through 220-3 and 240-1 through 240-3 for operator safety. In addition, the top floor 200-4 is provided with guardrails 256 for operator safety in connection with the feed hopper 206.

Figure 14:
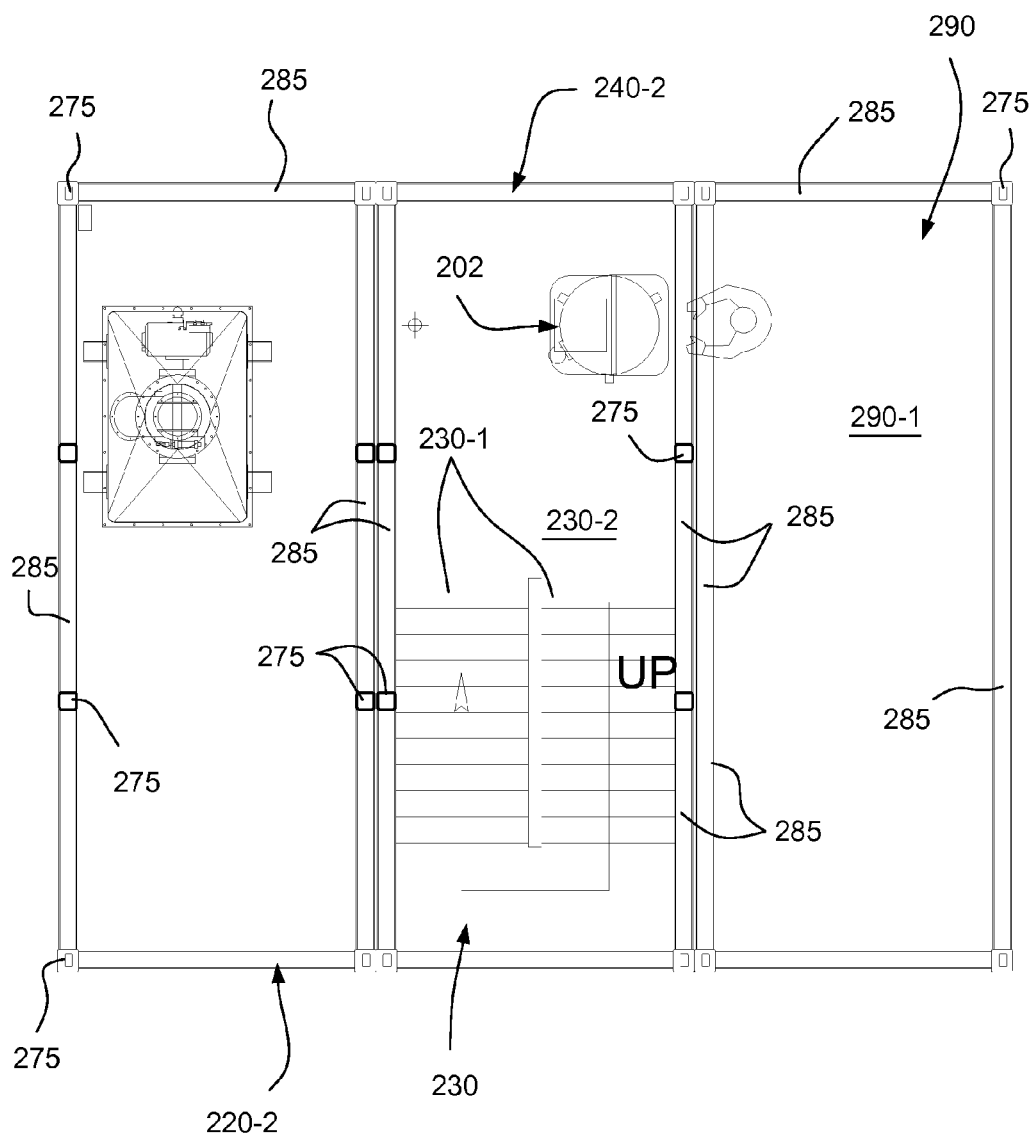
FIG. 14 is a top plan view of the modular units forming the second story of the plant depicted in FIGS. 11 and 12 as taken along line 14-14 in FIG. 12.

The modules 240-1 through 240-3 of the operator access stack 240 are designed to allow operators to move from one of the stories 200-1 through 200-4 to another. For such purpose, the modules 240-1 through 240-3 of the operator access stack 140 are provided with an interconnected stairwell 230 having a flight of stairs 230-1 and an associated stair landing 230-2 as is perhaps best shown in FIGS. 13-16. It will be observed that the embodiment of the production plant 200 includes the hand-add station 202 as a component part of the module 240-2 located on story 200-2. As such, an elevator lift is not provided by such embodiment. However, an additional module 290 is provided so as to house additional production equipment and/or components. Moreover, the elevation of such additional module 290 can be varied with respect to the elevation of the modules 220-1 and 240-1 by a concrete support slab 295 so that the top decking 290-1 (see FIG. 14) of the module 290 allows the operator to be positioned adjacent the hand-add station 202 associated with module 240-2.

As is perhaps best shown in FIGS. 13-16, each of the modules 220-1 through 220-3 and 240-1 through 240-3 are most preferably substantially identical to one another in size and configuration. More specifically, it will be seen that that each of the modules 220-1 through 220-3 and 240-1 through 240-3 are formed of a number of vertical frame members (a representative few of which are depicted by reference numeral 275) interconnected to a number of horizontal frame members (a representative few of which are depicted by reference numeral 285). The vertical frame members 275 and the horizontal frame members 285 are thus rigidly interconnected to one another so as to establish a generally rectangular parallelepiped shape which is sized so as to be accommodated within a standard 20-foot shipping container conventionally employed by the shipping industry.

Each of the individual production modules 220-1 through 220-3 may thus be further prefabricated to include specific support structures associated with the specific production equipment (e.g., hand-add station 202, transfer hopper 204, feed hopper 206, mixer 208, packaging station 210, cyclone 212 and the like) that such module will support and contain. Similarly, each of the individual operator access modules 240-1 through 240-3 may be prefabricated to include the stairs 130-1 and associated landing 130-2.

In use, the modules 220-1 through 220-3 and 240-1 through 240-3 and their associated equipment can be preassembled at the plant manufacturer's facility for the purpose of commissioning the plant. Thereafter the production equipment and associated plant components may be removed from the modules 220-1 through 220-3 and 240-1 through 240-3 and shipped individually along with each module to a production plant site. On arrival, the modules 220-1 through 220-3 and 240-1 through 240-3 may then be reassembled to one another along with their associated production equipment. As can be appreciated, by providing the entire production plant 200 in the form of separate modules 220-1 through 220-3 and 240-1 through 240-3 that can be shipped individually within a standard 20-foot shipping container will greatly decrease the necessary construction time thereby saving considerable cost.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A modular production plant comprising:
   a vertical stack of production modules for supporting production equipment; and
   a vertical stack of operator access modules adjacently connected to the vertically stacked production modules to allow operator access to the production modules, wherein
   the adjacently connected vertical stacks of production modules and operator access modules establish multiple stories of the modular production plant, wherein
   each of the production modules and operator access modules have a rectangular parallelepiped shape which is sized and configured to fit within a standard 20-foot shipping container, and wherein
   each of the operator access modules comprises a first portion having a stairwell comprised of a flight of stairs and a stair landing, and a second portion comprising an elevator well adjacently positioned relative to the first portion, wherein
   the vertical stack of operator access modules are positioned relative to one another so that the adjacent first and second portions of each operator access module are vertically stacked with the first and second portions of a vertically adjacent one of the operator access modules to thereby establish a vertically oriented stairwell and a vertically oriented elevator well from one access module to another, wherein
   the vertical stack of operator access modules includes an operator elevator positioned within the elevator well of the vertically stacked second portions of the operator access modules, the operator elevator being capable of ascending/descending movement within the elevator well from one of the multiple stories of the modular production plant to another.

2. The modular production plant as in claim 1, further comprising an elevator operable within the elevator well to allow an operator to ascend and descend between each of the multiple stories of the modular production plant.

3. The modular production plant as in claim 1, wherein each of the production modules and operator access modules includes a series of rigidly interconnected vertical and horizontal frame members.

4. The modular production plant as in claim 1, further comprising a cantilevered platform connected to and extending outwardly from an uppermost one of the production modules in the vertical stack thereof.

5. The modular production plant as in claim 1, further comprising guardrails positioned about a perimeter of each of the multiple stories.

6. The modular plant as in claim 1, further comprising at least one additional module adjacently connected to a lowermost production module or operator access module in the vertical stacks thereof.

7. The modular plant as in claim 1, further comprising an additional module adjacently connected to each lowermost production module and operator access module in the vertical stacks thereof.

8. The modular plant as in claim 1, wherein the production modules comprise equipment for the production of animal feed premix.

* * * * *